United States Patent [19]

Avery

[11] 4,253,121
[45] Feb. 24, 1981

[54] PLURAL SEQUENTIAL OPERATING MODE AUTOMATIC KINESCOPE BEAM CURRENT LIMITER

[75] Inventor: Leslie R. Avery, Flemington, N.J.

[73] Assignee: RCA Corporation, New York, N.Y.

[21] Appl. No.: 74,770

[22] Filed: Sep. 11, 1979

[30] Foreign Application Priority Data

Oct. 12, 1978 [GB] United Kingdom ............... 40301/78

[51] Int. Cl.³ .......................... H04N 5/68; H04N 5/14
[52] U.S. Cl. ........................................ 358/243; 358/74
[58] Field of Search ........................ 358/168, 243, 74; 315/30, 383

[56] References Cited

U.S. PATENT DOCUMENTS

| 3,914,545 | 10/1975 | Engel | 358/243 X |
| 4,096,518 | 6/1978 | Tuma et al. | 358/74 |
| 4,126,884 | 11/1978 | Shanley | 358/21 |

FOREIGN PATENT DOCUMENTS 2021037 11/1971 Fed. Rep. of Germany .
1514220 6/1978 United Kingdom .

OTHER PUBLICATIONS

Motorola TDA 3300 Specification Sheet, Mar. 1979.
"Funkschau", Heft 12, 1979, pp. 675-678.

Primary Examiner—Robert L. Richardson
Attorney, Agent, or Firm—Eugene M. Whitacre; William H. Meagher; Ronald H. Kurdyla

[57] ABSTRACT

An automatic kinescope beam current limiter in a television receiver comprises a sensing network for deriving a signal representative of average and peak beam current demand directly from the video signal cathode current of the kinescope, and a control circuit responsive to the derived signal. When excessive average beam current is sensed, the control circuit supplies a control voltage for modifying the D.C. level (brightness level) of the video signal in a direction to limit beam current demand over a first range of average beam currents, and subsequently supplies a control voltage for reducing the peak amplitude (contrast level) of the video signal to limit beam currents over a second range of relatively greater average beam currents. Conversely, when excessive peak beam current is sensed, the control circuit supplies a control voltage for reducing the peak amplitude of the video signal to limit beam current demand over a first range of peak beam currents, and subsequently supplies a control voltage for modifying the D.C. level of the video signal in a direction to limit beam current demand over a second range of relatively greater peak beam currents.

8 Claims, 3 Drawing Figures

PLURAL SEQUENTIAL OPERATING MODE AUTOMATIC KINESCOPE BEAM CURRENT LIMITER

This invention concerns apparatus for automatically limiting excessive peak and average beam currents drawn by an image reproducing kinescope in a television receiver or equivalent video signal processing system.

The content of an image reproduced by a kinescope in a television receiver comprises luminance information, and also chrominance information in the case of a color image in a color television system. Picture information as displayed by the kinescope is typically defined by the peak-to-peak amplitude component of the video signal, relating to image contrast, and by the D.C. component of the video signal, relating to image brightness or background level. Both of these components can contribute to excessive beam currents drawn by the kinescope.

Excessive beam currents can cause a receiver to produce a degraded image such as by impairing the operation of the receiver deflection system, causing beam spot defocusing, and producing picture "blooming." High beam currents may also exceed the safe operating current capability of the kinescope, possibly causing damage to the kinescope and associated circuit components. In particular, excessive peak beam currents such as may be associated with stationary image (e.g., video games patterns or "Teletext" type alphanumerics displays) are likely to cause kinescope "screen burn."

Various automatic kinescope beam current limiters for controlling both the peak-to-peak and D.C. components of the video signal are known. For example, British Pat. No. 1,514,220 describes a system wherein kinescope cathode current is sensed directly to derive a signal representative of kinescope beam current demand. The derived signal is employed to develop a control voltage representative of excessive peak and average beam currents. The control voltage serves to limit excessive beam current by simultaneously varying the peak amplitude of the luminance and chrominance components of the video signal via contrast and color saturation control circuits of the receiver. U.S. Pat. No. 4,126,884-Shanley describes an average responding beam limiter system wherein a control voltage representative of excessive average beam current demand is utilized to control video signal peak amplitude (contrast level) over a first range of excessive beam current, and to control both video signal peak amplitude and D.C. level (contrast level and brightness level) over a second range of relatively greater excessive beam currents. U.S. Pat. No. 4,096,518-Tuma, et al. also describes an average responding beam current limiter system. In this system, a derived average representative control voltage is used to control the video signal D.C. level over a first range of excessive beam current, and to control the video signal peak amplitude over a second range of relatively greater excessive beam currents. In each of the latter two average responding systems, the average representative control voltage is derived by sensing the kinescope resupply load current developed by the kinescope high voltage supply.

In accordance with the principles of the present invention, it is recognized as desirable for an automatic kinescope beam current limiter to exhibit plural operating modes for providing sequential control of video signal peak amplitude and D.C. level under excessive beam current conditions, as a function of excessive average beam current in one operating mode and as a function of excessive peak beam current in another mode. It is moreover considered advantageous for such a system to respond to a signal derived directly from the kinescope beam current (e.g., cathode current) rather than to a remotely sensed representative current (e.g., the kinescope high voltage resupply current), to permit an accurate peak and average beam current limiting control response by the system.

Apparatus according to the present invention is included in a system for processing an image representative video signal having a peak amplitude component determinative of image contrast and a D.C. component determinative of image brightness, the system including a video signal processing channel and a kinescope including an intensity control electrode for reproducing an image in response to video signals applied to the intensity control electrode from said channel. A first sensing network responds to a derived signal representative of the magnitude of peak and average beam currents conducted by the kinescope for providing a first peak control signal representative of excessive peak beam currents above a peak threshold level within a first range of peak beam currents, and for providing a second peak control signal representative of excessive peak beam currents with a second range of relatively greater peak beam currents. A second sensing network responds to the derived signal for providing a first average control signal representative of excessive average beam currents above an average threshold level within a first range of average beam currents, and for providing a second average control signal representative of excessive average beam currents within a second range of relatively greater average beam currents. A first control sequencing network supplies the first peak control signal to the video channel to modify one of the peak amplitude and D.C. components of the video signal in a direction to limit beam currents conducted by the kinescope above the peak threshold level, when peak beam currents within the first range of peak currents are present, and also supplies the second peak control signal to the video channel to modify the other of the peak amplitude and D.C. components of the video signal in a direction to limit beam currents above the peak threshold level, when peak beam currents within the second range are present. A second control sequencing network supplies the first average control signal to the video channel to modify the other of the peak amplitude and D.C. components of the video signal in a direction to limit beam currents above the average threshold level, when average beam currents within the first range of average currents are present, and also supplies the second average control signal to the video channel to modify said one of said peak amplitude and D.C. components of the video signal peak component in a direction to limit beam currents above the average threshold level, when average beam currents within the second range are present.

In accordance with a feature of the invention, first the peak video signal component and subsequently the D.C. component of the video signal are modified in a direction to limit kinescope beam current demand above the peak threshold level, in the presence of kinescope peak beam current demand within the first and second ranges of excessive kinescope peak currents, respectively. Conversely, first the D.C. component of the video signal and afterwards the peak video signal component are modified in a direction to limit kinescope beam current demand above the average threshold level, in the presence of kinescope average beam current demand within the first and second ranges of excessive kinescope average currents.

In accordance with a further feature of the invention, the first and second sensing networks respond to a signal derived directly from currents conducted through the kinescope intensity control electrode, to provide an accurate measure of excessive peak and average kinescope beam current demand.

Figure 1:
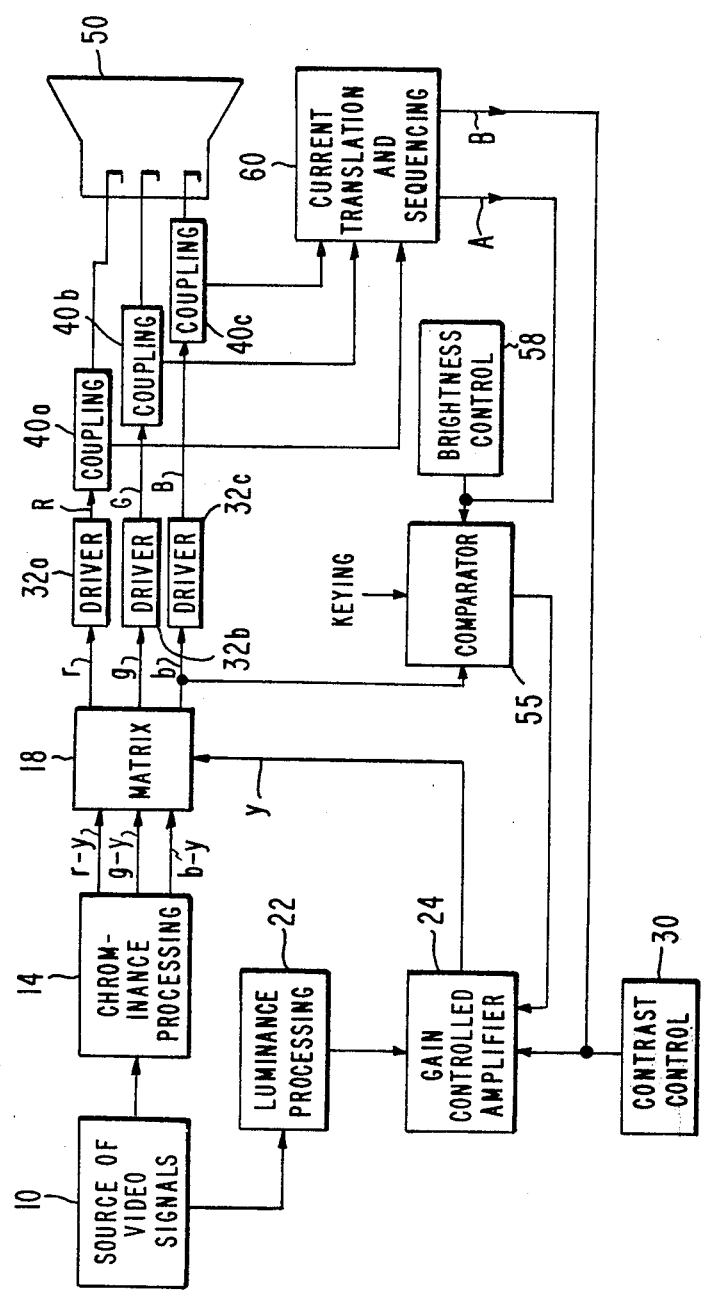
FIG. 1 illustrates a block diagram of a portion of a color television receiver including kinescope beam current limiter apparatus according to the present invention.

In FIG. 1, a source 10 of video signals including luminance and chrominance components provides a separated chrominance component from one output to a chrominance signal processing unit 14 in a chrominance channel of the receiver, which produces r-Y, g-Y and b-Y color difference signals. A separated luminance component is supplied from another output of unit 10 to a luminance processing unit 22 in a luminance channel of the receiver. Luminance signals processed by unit 22 are supplied to a signal input of a gain controlled luminance amplifier 24 (e.g., a differential amplifier). A contrast control unit 30 (e.g., a viewer adjustable potentiometer) is coupled to a gain control input of amplifier 24 for varying the gain of amplifier 24, and thereby the peak-to-peak amplitude of signals processed by amplifier 24, in accordance with the setting of contrast control 30.

An amplified luminance signal (Y) from a signal output of amplifier 24 is supplied to a signal matrix 18 where the luminance signal is combined with the color difference signals from unit 14 to produce output r, g, and b color image representative signals. These signals are respectively amplified by kinescope driver amplifiers 32a, 32b and 32c to produce high level amplified R, G and B color signals. Each of driver amplifiers 32a, 32b and 32c can be arranged in cascode configuration such as described in U.S. Pat. No. 4,118,731, for example. The R, G, B signals are supplied to respective red, green and blue cathode intensity control electrodes of a color kinescope 50 via separate coupling networks 40a, 40b and 40c.

The system of FIG. 1 also includes a keyed sampling comparator 55 arranged in a closed automatic brightness control loop as follows. One signal input of comparator 55 senses the low level blue (b) signal output of matrix 18, and a second signal input of comparator 55 senses a brightness determinative reference voltage provided from a manually adjustable brightness control 58 (e.g., a viewer adjustable potentiometer). Comparator 55 is keyed in response to keying signals occurring during periodic horizontal image blanking intervals of the video signal, for sampling and comparing the (blanking) level of the signal then appearing at the b signal output of matrix 18 with the brightness reference level from brightness control 58. If an imbalance exists between these two levels, comparator 55 generates an output correction signal which is applied to a D.C. level control input of luminance amplifier 24. The correction signal serves to modify the D.C. level of the output signal from amplifier 24, and thereby also the D.C. level of the b signal output from matrix 18, in a direction to minimize the difference between the sampled signal inputs to comparator 55. By this mechanism, the luminance signal D.C. level and thereby the D.C. level of each of the r, g, b signals can be varied by varying the level of the signal applied to the brightness reference signal input of comparator 55. Additional details of the closed brightness control loop including comparator 55, amplifier 24 and matrix 18 are found in a copending U.S. patent application, Ser. No. 794,128 of A. V. Tuma, et al., entitled "Brightness Control Circuit Employing A Closed Control Loop."

Automatic kinescope beam current limiting is accomplished by means of an arrangement including a current translation and sequencing control network 60, which receives input signals from an auxiliary output of each of cathode signal coupling networks 40a, 40b and 40c.

As will be discussed in detail subsequently, signals provided to network 60 from each of the cathode coupling networks are directly proportional to the level of cathode current. The cathode currents essentially correspond to the beam currents conducted by the electron guns of kinescope 50, including peak and average beam current variations. Network 60 includes circuits for sensing the presence of excessive levels of peak and average beam currents above a threshold level, as manifested by the proportional signals from the auxiliary outputs of the cathode coupling networks.

Under conditions of excessive average beam current demand, network 60 first supplies a control signal from an output A via appropriate coupling circuits to the brightness reference signal input of comparator 55. This control signal is proportional to the magnitude of excessive average beam current demand over a first range of average beam currents. Network 60 subsequently provides a control signal from an output B via appropriate coupling circuits to the gain control input of amplifier 24. This control signal is produced in response to average beam currents within a second range of currents of a magnitude greater than currents within the first range, and is proportional to the level of average beam currents within the second range. The initial control signal serves to modify the D.C. level of the video signal in a direction to limit average kinescope beam currents within the first range. The second, relatively delayed control signal serves to reduce the signal gain of amplifier 24, and therefore also the peak-to-peak amplitude of the video signal, in a direction to limit average beam currents within the second range. Thus image brightness and then image contrast are sequentially varied during the average beam current limiting mode.

Under conditions of excessive peak beam current demand, network 60 first supplies a control signal from output B to the gain control input of amplifier 24. This control signal is proportional to the magnitude of excessive peak beam current demand over a first range of peak currents. Network 60 subsequently provides a second control signal from output A to the brightness reference signal input of comparator 55. This control signal is produced in response to peak beam currents within a second range of currents of a magnitude greater than currents within the first range, and is proportional to the level of peak beam currents within the second range. The initial control signal in this case serves to reduce the signal gain of amplifier 24, and therefore also the peak-to-peak amplitude of the video signal, in a direction to limit peak beam currents within the first range. The second, relatively delayed control signal serves to modify the D.C. level of the video signal in a direction to limit peak beam currents within a second range. Thus image contrast and afterwards image brightness are sequentially varied during the peak beam current limiting mode.

With this system, the D.C. level of the video signal is initially modified to reduce beam current demand in the presence of excessive average beam currents, since such currents are considered to be primarily attributable to the D.C. component of the video signal. Similarly, the peak amplitude of the video signal is first modified to reduce beam current demand in the presence of excessive peak beam currents, since such currents are considered to be primarily attributable to the peak-to-peak amplitude of the video signal. It is noted that excessive average beam currents can be attributable to the content of a received signal or to misadjustment by a viewer of a manual brightness control often included in a luminance signal channel of the receiver, or both. However, high average beam current levels are more commonly caused by misadjustment of the brightness control in a direction to produce high brightness, since it is unlikely that a video signal will be transmitted with a luminance level corresponding to excessive brightness. Excessive peak beam currents are primarily attributable to the peak-to-peak amplitude of the video signal as received and as peaked by amplitude peaking circuits in the receiver (e.g., such as may be included in luminance processor 22).

Figure 2:
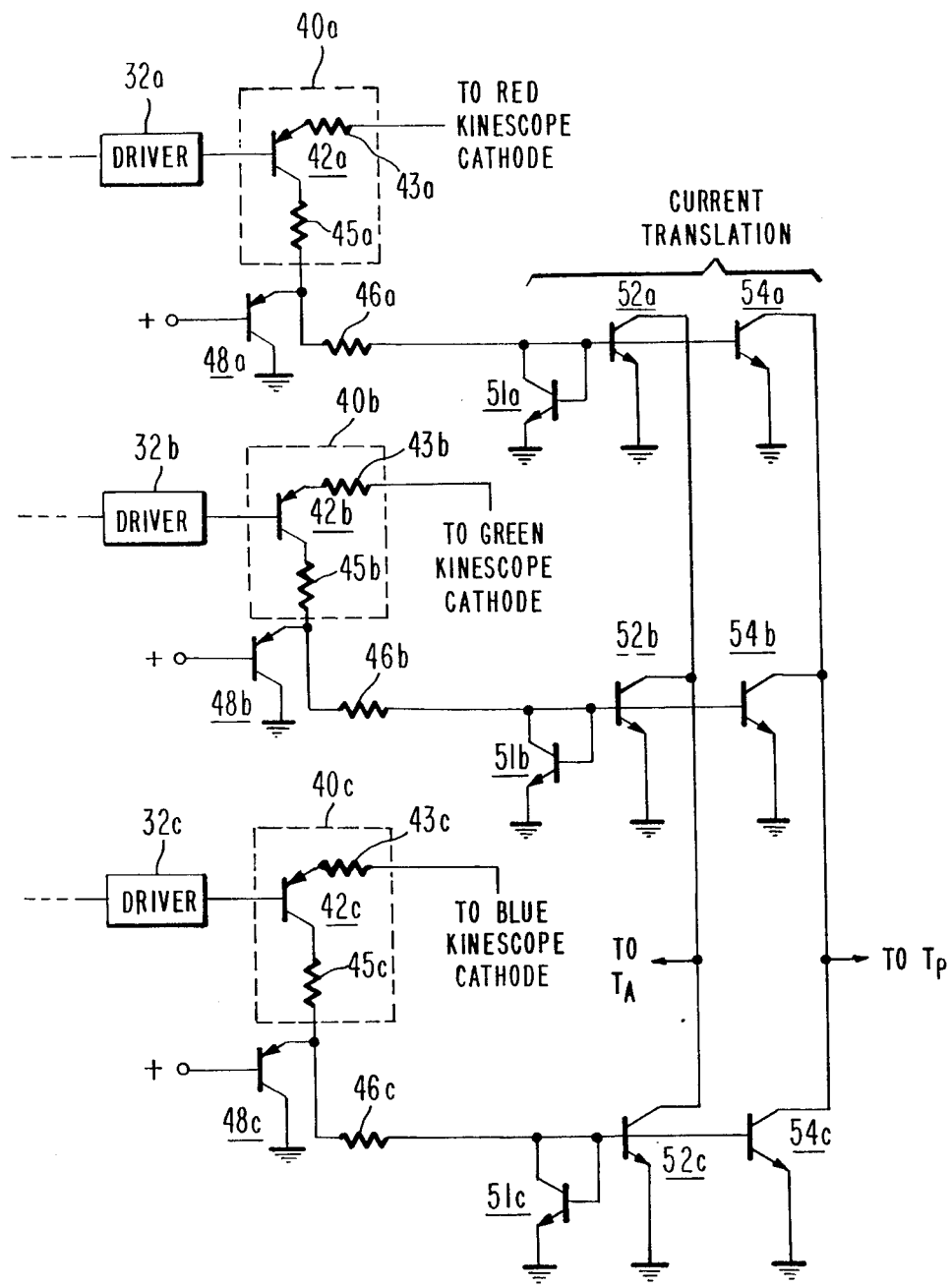
FIG. 2 depicts a schematic circuit diagram showing circuit details of a portion of the apparatus of FIG. 1, comprising apparatus according to the present invention.

Referring now to FIG. 2, there are shown circuit details of kinescope cathode signal coupling networks 40a–40c, and details of current translating circuits within unit 60 of FIG. 1.

Red cathode signal coupling network 40a includes a PNP follower transistor 42a with base and emitter electrodes respectively coupled to the output of red driver 32a and the red cathode of kinescope 50. Resistors 43a and 45a in the emitter and collector circuits of transistor 42a serve as surge current protection devices in the event of kinescope flashovers. A current limiting resistor 46a and a normally non-conductive clamp transistor 48a are also included in the collector circuit of transistor 42a. Clamp transistor 48a conducts when rendered forward biased in response to abnormal high voltage conditions, to clamp the junction of resistors 45a and 46a to a voltage equal to the base bias voltage of transistor 48a plus the base-emitter junction offset voltage of transistor 42a. Green cathode signal coupling network 40b includes a PNP follower transistor 42b as well as surge protection resistors 43b and 45b. A current limiting resistor 46b and a clamp transistor 48b are associated with network 40b. Blue cathode signal coupling network 40c includes a PNP follower transistor 42c as well as surge protection resistors 43c and 45c. A current limiting resistor 46c and a clamp transistor 48c are associated with network 40c.

Red, green and blue cathode signal currents, as induced by video signals supplied from red, green and blue signal drivers 32a, 32b and 32c, respectively flow from the red, green and blue kinescope cathodes through the emitter-collector paths of transistors 42a, 42b and 42c and through the collector resistors of each of these transistors (the base currents of transistors 42a, 42b and 42c are negligible). The cathode currents flowing in the collector circuits of devices 42a, 42b and 42c essentially correspond to beam currents conducted by the red, green and blue electron guns of kinescope 50, respectively.

The collector current of PNP device 42a is supplied to a current translation stage including a diode-connected transistor 51a and transistors 52a, 54a. These devices are arranged in a current mirror configuration wherein the collector current of transistor 42a, which flows to ground via transistor 51a, is reflected or duplicated as collector current in each of transistors 52a and 54a. The relative magnitudes of the currents conducted by transistor 51a and transistors 52a, 54a can be tailored by proportioning the base-emitter junction geometries of transistors 51a, 52a and 54a, as is known. The collector currents of PNP devices 42b and 42c are similarly supplied to respective current mirror circuits 51b, 52b, 54b and 51c, 52c, 54c, which serve the same purpose as current mirror stage 51a, 52a, 54a.

Figure 3:
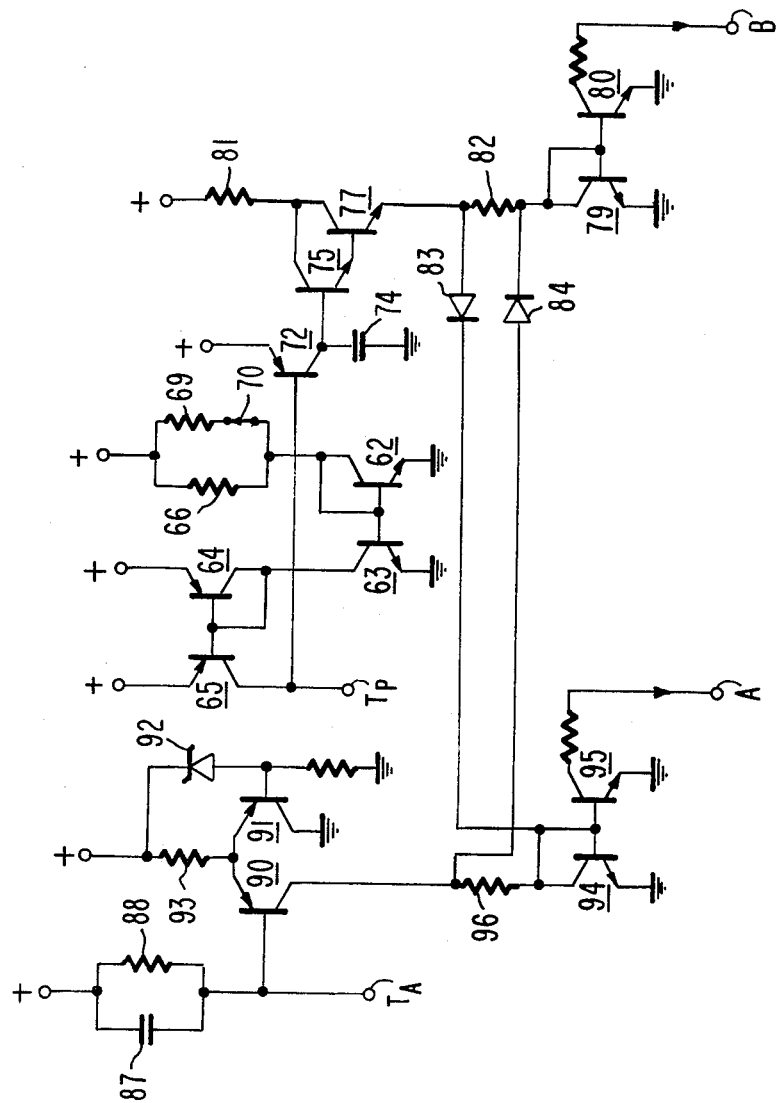
FIG. 3 shows a schematic circuit diagram of another portion of the apparatus of FIG. 1.

The collector outputs of transistors 52a, 52b, 52c are combined and coupled to a terminal $T_A$ as shown in FIG. 3. The collector outputs of transistors 54a, 54b and 54c are also combined, and coupled to a terminal $T_P$ as shown in FIG. 3.

Referring now to FIG. 3, which illustrates additional circuit details of unit 60 in FIG. 1, transistor pairs 64, 65 and 62, 63 each form a current mirror arrangement in a peak beam current limiting network. The threshold current conduction level of these transistors under conditions of excessive beam current is determined by a switched resistor network including resistors 66, 69 coupled to a source of positive D.C. operating potential (e.g., +12 volts), and a switch 70. In this example, a high peak beam current limiting threshold is established with switch 70 closed as shown, while a relatively lower peak beam current limiting threshold is established when switch 70 is open.

Transistor 65 is saturated (highly conductive) whereby a transistor 72 is caused to be non-conductive under normal beam current conditions. Transistors 65 comes out of saturation and conducts in a linear region, and transistor 72 begins conducting in a linear region, when the peak beam current exceeds the threshold current level determined by network 66, 69, 70. This occurs when the total collector currents of one or more of transistors 54a, 54b, 54c (FIG. 2) exceeds the saturation current level of transistor 65. Since this typically occurs sporadically in response to large cathode current peaks, transistor 72 typically conducts current pulses rather than a long term average current.

Current pulses from transistor 72 during peak beam limiting operation charge a peak responding capacitor 74. Base current conducted by transistor 75 serves to bleed (discharge) a small amount of charge from capacitor 74 during the beam limiting and normal operating modes. In this example, the discharge time constant of the circuit including capacitor 74 is less than the time of approximately three image scanning fields. Transistors 75 and 77 conduct in response to a charge of sufficient magnitude developed on capacitor 74, and supply a corresponding peak representative current from an emitter of transistor 77 via a bias resistor 82 to a current mirror arrangement comprising a transistor 80 and a diode connected transistor 79. Transistors 75 and 77 are arranged in a high input impedance Darlington amplifier configuration to minimize the charge depletion on capacitor 74 between peak beam current intervals. A resistor 81 limits the maximum current available through transistors 75 and 77.

The increased conduction of transistor 80 in response to excessive peak beam current produces a corresponding reduction in the collector voltage of transistor 80, wherby the control voltage at output terminal B of unit 60 decreases a proportional amount. This control voltage serves to reduce the gain of amplifier 24 (FIG. 1) and thereby the peak amplitude of the video signals applied to the kinescope, in a direction to limit kinescope beam current conduction over a first range of excessive peak beam currents.

When excessive peak beam currents within a second range of relatively greater beam currents are present, the emitter output current of transistor 77 causes a transistor 95 to conduct a proportional amount. In this instance, the relatively delayed conduction of transistor 95 is attributable to the "hold off" action of resistor 82 and a normally non-conductive diode 83, which serve as a threshold conduction determining network to delay the conduction of transistor 95 relative to transistor 80, until beam currents within the second range are present. Specifically, the current flowing in resistor 82 (in response to beam currents within the second range) develops a voltage across resistor 82 sufficient to bias diode 83 into conduction. At this time, transistor 80 is effectively saturated and no longer increases in conduction. The increased conduction of transistor 95 in response to the bias supplied via resistor 82 and diode 83 over the second range of beam currents produces a corresponding reduction in the collector voltage of transistor 95 whereby the control voltage at output terminal A of unit 60 decreases a proportional amount. This control voltage serves to modify the brightness determinative D.C. level of the video signal, as discussed in connection with FIG. 1, in a direction to limit excessive kinescope beam current conduction over the second range of peak currents.

For average beam current limiting purposes, the combined beam current representative collector currents from transistors 52a, 52b and 52c (FIG. 1) as developed at terminal T$_A$ are averaged by a filter network comprising a parallel coupled filter capacitor 87 and a resistor 88. A differential comparator comprising transistors 90 and 91 compares a voltage representative of average beam current developed at a base of transistor 90, with a reference voltage developed by a zener diode 92 at a base of transistor 91.

Current from a current source resistor 93 flows through transistor 91 to ground when the beam current representative base voltage of transistor 90 does not exceed the fixed base voltage of transistor 91. When the base voltage of transistor 90 exceeds that of transistor 91, transistor 90 conducts collector current of a magnitude proportional to the base voltage of transistor 90. This collector current is supplied via a bias resistor 96 to a current mirror arrangement comprising a diode connected transistor 94 and transistor 95, causing transistor 95 to increase in conduction by a proportional amount.

Over a first range of excessive average beam currents, the increased conduction of transistor 95 produces a corresponding reduction in the collector voltage of transistor 95, whereby the control voltage at output terminal A decreases a proportional amount. The control voltage from output A serves to modify the D.C. level of the video signal in a direction to limit excessive average beam currents, in the manner explained earlier.

When excessive average beam currents within a second range of relatively greater beam currents are present, transistor 80 is caused to conduct a proportional amount. In this instance, the relatively delayed conduction of transistor 80 is attributable to the "hold-off" action of resistor 96 and a normally non-conductive diode 84. Specifically, the current flowing in resistor 96 (in response to beam currents within the second range) develops a voltage across resistor 96 sufficient to forward bias diode 94 into conduction. At this time, transistor 95 is effectively saturated. The increased conduction of transistor 80 in response to the bias supplied via resistor 96 and diode 84 over the second range of excessive beam currents produces a corresponding reduction in the collector voltage of transistor 80, whereby the control voltage at output terminal B decreases a proportional amount. This control voltage then serves to reduce the peak amplitude of the video signal to limit excessive beam currents, as also explained above.

The current mirror ratios, or relative levels of current conduction, associated with each of current mirrors 79, 80 and 94, 95 are chosen to provide a desired amount of control loop gain while preserving control loop stability. The point at which transistor 95 conducts in the peak beam limiting mode, and the point at which transistor 80 conducts in the average beam limiting mode, can be varied by tailoring the value of resistors 82 and 96, respectively.

It is noted that the described plural mode automatic beam current limiter arrangement can be employed in a color television receiver as shown, as well as in a monochrome receiver. Also, peak beam current limiting can be accomplished with respect to all three kinescope electron guns concurrently as discussed, or separately with respect to individual electron gums.

What is claimed is:

1. In a system for processing an image representative video signal having a peak amplitude component determinative of image contrast and a D.C. component determinative of image brightness, said system including a video signal processing channel; and an image reproducing kinescope including an intensity control electrode for reproducing an image in response to video signals applied to said intensity control electrode from said channel; apparatus comprising:

means for deriving a signal representative of the magnitude of peak and average beam currents conducted by said kinescope;

first sensing means responsive to said derived signal for providing a first peak control signal representative of excessive peak beam currents above a peak threshold level within a first range of peak beam currents, and for providing a second peak control signal representative of excessive peak beam currents with a second range of relatively greater peak beam currents;

second sensing means responsive to said derived signals for providing a first average control signal representative of excessive average beam currents above an average threshold level within a first range of average beam currents, and for providing a second average control signal representative of excessive average beam currents within a second range of relatively greater average beam currents;

first control sequencing means for supplying said first peak control signal to said video channel to modify one of said peak amplitude and D.C. components of said video signal in a direction to limit beam currents conducted by said kinescope above said peak threshold level, in the presence of peak beam currents within said first range of peak currents; and for supplying said second peak control signal to said video channel to modify the other of said peak amplitude and D.C. components of said video signal in a direction to limit beam currents above said peak threshold level, in the presence of peak beam currents within said second range; and second control sequencing means for supplying said first average control signal to said video channel to modify said other of said peak amplitude and D.C. components of said video signal in a direction to limit beam currents above said average threshold level, in the presence of average beam currents within said first range of average currents; and for supplying said second average control signal to said video channel to modify said one of said peak amplitude and D.C. components of said video signal peak component in a direction to limit beam currents above said average threshold level, in the presence of average beam currents within said second range.

2. Apparatus according to claim 1, wherein:

said first peak control signal is supplied to said video channel for modifying said peak video signal component in a direction to limit beam currents conducted by said kinescope above said peak threshold level, in the presence of peak beam currents within said first range of peak currents; and said second peak control signal is supplied to said video channel for modifying said D.C. component of said video signal in a direction to limit beam currents above said peak threshold level, in the presence of peak beam currents within said second range; and wherein said first average control signal is supplied to said video channel for modifying said D.C. component of said video signal in a direction to limit kinescope beam currents above said average threshold level in the presence of average beam currents within said first range of average currents; and said second average control signal is supplied to said video channel for modifying said peak video signal component in a direction to limit beam currents above said average threshold level, in the presence of average beam currents within said second range.

3. In a system for processing an image representative video signal having a peak amplitude component determinative of image contrast and a D.C. component determinative of image brightness, said system including a video signal processing channel; and an image reproducing kinescope including an intensity control electrode for reproducing an image in response to video signals applied to said intensity control electrode from said channel, currents conducted by said kinescope through said intensity control electrode being responsive to said peak amplitude and D.C. components of said video signal and corresponding to beam current conducted by said kinescope; apparatus comprising:

means coupled to said intensity control electrode for deriving a signal representative of the magnitude of said kinescope beam current, directly from said currents conducted through said intensity control electrode;

first sensing means responsive to said derived signal for providing a first peak control signal representative of excessive peak beam currents above a peak threshold level within a first range of peak beam currents, and for providing a second peak control signal representative of excessive peak beam currents within a second range of relatively greater peak beam currents;

second sensing means responsive to said derived signals for providing a first average control signal representative of excessive average beam currents above an average threshold level within a first range of average beam currents, and for providing a second average control signal representative of excessive average beam currents within a second range of relatively greater average beam currents;

first control sequencing means for supplying said first peak control signal to said video channel to modify one of said peak amplitude and D.C. components of said video signal in a direction to limit beam currents conducted by said kinescope above said peak threshold level; in the presence of peak beam currents within said first range of peak currents; and for supplying said second peak control signal to said video channel to modify the other of said peak amplitude and D.C. components of said video signal in a direction to limit beam currents above said peak threshold level, in the presence of peak beam currents within said second range; and second control sequencing means for supplying said first average control signal to said video channel to modify said other of said peak amplitude and D.C. components of said video signal in a direction to limit beam currents above said average threshold level, in the presence of average beam currents within said first range of average currents; and for supplying said second average control signal to said video channel to modify said one of said peak amplitude and D.C. components of said video signal peak component in a direction to limit beam currents above said average threshold level, in the presence of average beam currents within said second range.

4. Apparatus according to claim 3, wherein:

said first peak control signal is supplied to said video channel for mofidying said peak video signal component in a direction to limit beam currents conducted by said kinescope above said peak threshold level, in the presence of peak beam currents within said first range of peak currents; and said second peak control signal is supplied to said video channel for modifying said D.C. component of said video signal in a direction to limit beam currents above said peak threshold level, in the presence of peak beam currents within said second range; and wherein said first average control signal is supplied to said video channel for modifying said D.C. component of said video signal in a direction to limit kinescope beam currents above said average threshold level in the presence of average beam currents within said first range of average currents; and said second average control signal is supplied to said video channel for modifying said peak video signal component in a direction to limit beam currents above said average threshold level, in the presence of average beam currents within said second range.

5. Apparatus according to claims 3 or 4, wherein:

said intensity control electrode corresponds to a cathode electrode of said kinescope.

6. Apparatus according to claim 5, wherein:

said signal deriving means comprises an active current conduction device having a first electrode for receiving said video signals, a second electrode coupled to said kinescope cathode electrode, and a third electrode coupled to a point of reference potential and defining a main current conduction path of said active device for cathode current conduction between said second and third electrodes.

7. Apparatus according to claim 6, wherein:
said active device comprises a PNP conductivity type transistor having a base electrode for receiving said video signals, an emitter electrode coupled to said kinescope cathode electrode, and a collector electrode coupled to said point of reference potential.

8. In a color television receiver for processing a color image representative video signal having a peak amplitude component determinative of image contrast and a D.C. component determinative of image brightness, said system including a video signal processing channel; and a color image reproducing kinescope including plural intensity control electrodes for reproducing a color image in response to video signals applied to said intensity control electrode from said channel, currents conducted by said kinescope through said intensity control electrodes being responsive to said peak amplitude and D.C. components of said video signal and corresponding to beam currents conducted by said kinescope; apparatus comprising:

plural means respectively coupled to said intensity control electrodes for deriving signals representative of the magnitude of beam currents conducted by said kinescope, directly from said currents conducted through said intensity control electrodes;

first sensing means responsive to said derived signals for providing a first peak control signal representative of excessive peak beam currents above a peak threshold level within a first range of peak beam currents, and for providing a second peak control signal representative of excessive peak beam currents within a second range of relatively greater peak beam currents;

second sensing means responsive to said derived signals for providing a first average control signal representative of excessive average kinescope beam currents above an average threshold level within a first range of average beam currents, and for providing a second average control signal representative of excessive average beam currents within a second range of relatively greater average beam currents;

first control sequencing means for supplying said first peak control signal to said video channel to modify said peak video signal component in a direction to limit beam currents conducted by said kinescope above said peak threshold level, in the presence of peak beam currents within said first range of peak currents; and for suplying said second peak control signal to said video channel to modify said video signal D.C. component in a direction to limit beam currents above said peak threshold level, in the presence of peak beam currents within said second range; and second control sequencing means for supplying said first average control signal to said video channel to modify said video signal D.C. component in a direction to limit beam currents above said average threshold level, in the presence of average beam currents within said first range of average currents; and for supplying said second average control signal to said video channel to modify said video signal peak component in a direction to limit beam currents above said average threshold level, in the presence of average beam currents within said second range.

* * * * *